Dec. 5, 1961 T. E. FIDDLER 3,011,234
SPRING BIASED ATTACHING CLIP
Filed Sept. 2, 1958
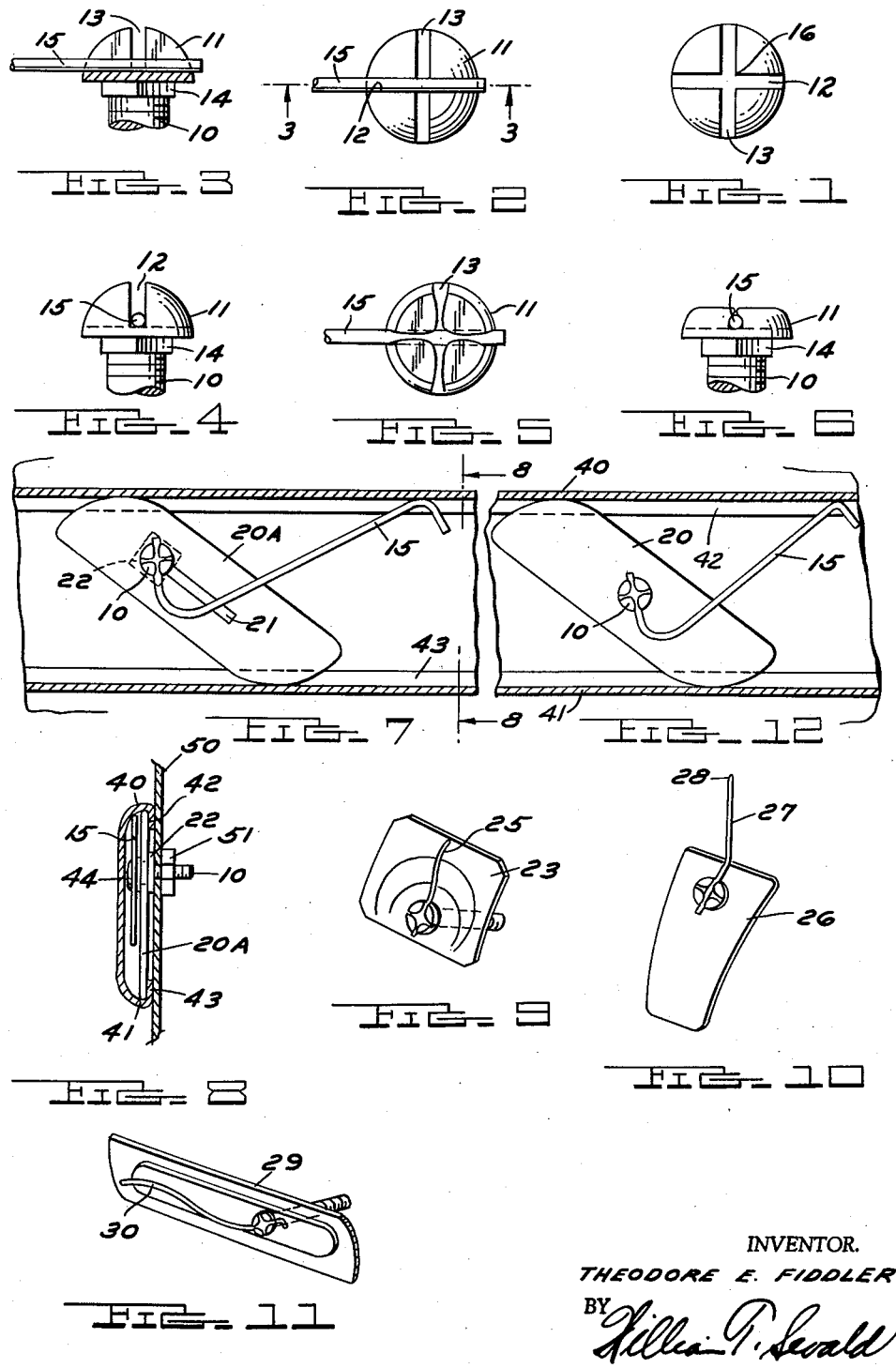
INVENTOR.
THEODORE E. FIDDLER
ATTORNEY

United States Patent Office 3,011,234
Patented Dec. 5, 1961

3,011,234
SPRING BIASED ATTACHING CLIP
Theodore E. Fiddler, 1200 Cedar Ave.,
Birmingham, Mich.
Filed Sept. 2, 1958, Ser. No. 758,419
5 Claims. (Cl. 24—73)

This invention relates to spring biased attaching clips for pre-mounting the clip to a molding and for subsequently attaching the molding to a body.

Spring biased clips have been employed heretofore to facilitate the preliminary mounting of the clip to the molding and subsequently mounting the molding via the clip to a body; however, the several devices of the prior art have not proven entirely satisfactory inasmuch as they are complicated in design and construction, expensive to manufacture, and difficult to embody a true spring arm portion with the clip plate portion.

With the foregoing in view, the primary object of the invention is to provide a spring biased clip which is simple in design and construction, inexpensive to manufacture, easy to use, and easy to embody a true spring arm with the bolt and plate of the clip.

An object of the invention is to provide a clip plate having a bolt receiving aperture for receiving the bolt in secured relationship to prevent relative rotation therebetween.

An object of the invention is to provide a head on the bolt having a slot therein for receiving and attaching the spring arm thereto.

An object of the invention is to provide an easy attaching means for the spring arm to the device so that a separate true spring arm can be used and wherein it is only necessary to pean or rivet the bolt head adjacent the slot over the spring arm to effect the attachment.

An object of the invention is to provide a spring biased clip wherein the clip plate, bolt, and spring arm can be separately manufactured and heat treated and later assembled so that the heat-treating of the plate, bolt, and spring arm can be individually and separately processed.

An object of the invention is to provide a spring clip wherein the spring arm, bolt, and clip plate can be easily assembled and joined together regardless of difference of hardness, spring tension, or form.

An object of the invention is to provide an easy attachment between the spring arm and the bolt and between the bolt and the clip plate to facilitate attachment therebetween regardless of form and to eliminate small bends, projections, etc. which are incompatible with hardened heat treated items.

An object of the invention is to provide a cross-slot in the bolt head relative to the spring arm receiving slot so that additional evacuated area is provided so that the head of the bolt can be peaned or riveted down in hard contact with the spring arm without spreading the bolt head away from the spring arm.

An object of the invention is to provide a cross-slot in the bolt head relative to the spring arm receiving slot so that the corners formed in the bolt head at the point of intersection of the slots can be peaned directly into hard physical contact with the spring arms to fixedly secure the spring arm relative to the bolt head.

These and other objects of the invention will become apparent by reference to the following description of a spring clip embodying the invention taken in connection with the accompanying drawing in which:

FIG. 1 is a top plan view of a bolt head showing the cross slots.

FIG. 2 is a view similar to FIG. 1 showing the spring arm disposed in the bolt head slot.

FIG. 3 is a cross-sectional view of FIG. 2 taken on the line 3—3 thereof.

FIG. 4 is a view similar to FIG. 3 taken at 90 degrees angulation thereof.

FIG. 5 is a top plan view similar to FIG. 2 showing the bolt head material peaned down into hard physical contact with the spring arm.

FIG. 6 is a side elevational view of the device seen in FIG. 5.

FIG. 7 is a view showing a spring clip with the arms thereof attached and in mounted relation to a molding with the molding being shown partially in cross-section.

FIG. 8 is a cross-sectional view of FIG. 7 taken on the line 8—8 thereof.

FIG. 9 is a perspective view of a clip showing a spring arm of different form.

FIG. 10 is a perspective view of a clip showing a spring arm of different form.

FIG. 11 is a perspective view of a clip showing a spring arm of different form; and FIG. 12 is a view similar to FIG. 7.

Referring now to the drawing wherein like numerals refer to like and corresponding parts throughout the several views, the devices disclosed therein to illustrate the invention comprise a bolt 10, FIGS. 1 to 6, having a head 11 provided with a spring wire arm receiving slot 12 and a cross slot 13, and having an angular section of square shank portion 14 to facilitate attachment to the clip plate. The wire spring arm 15 is disposed in one cross slot such as the receiving slot 12 as shown in FIGS. 2, 3, and 4 and upon the spring arm 15 being so disposed, the bolt head 11 is peaned or riveted down as seen in FIGS. 5 and 6 over the portion of the wire spring arm 15 lying within the area of the bolt head to firmly annex the spring arm 15 to the bolt head and the cross slot provides additional evacuated area for receiving the material of the peaned or riveted head 11 so as to prevent the head spreading away from the spring arm 15 and so as to permit the bolt head material in its peaned or riveted condition to closely surround and tightly grip the spring wire arm 15. It is to be noted that the corners 16 formed in the bolt head by the slots 12 and 13 are relatively sharp and that the peaning or riveting operation drives the corners 16 into hard physical contact with the spring arm 15 fixately locating the spring arm 15 relative to the bolt head 11; while the cross slots 12 and 13 are preferable it is obvious that the single receiving slot 12 can be used within the scope of the invention without the cross slot 13.

The clip body plate 20 is provided with an angular or square bolt receiving aperture to conform to the angulation of the bolt shank 14 so that when the shank 14 lies within the plate aperture relative rotation between the plate and bolt is prevented. The plate 20-A is provided with a slot 21 for receiving the shank 14 in sliding relationship relative thereto and when the slot 21 is utilized a washer like member 22 is secured to the bolt 10 to hold the shank 14 in the slot 21 as seen in FIG. 8.

A single assembly operation is all that is necessary to assemble the spring wire arm 15 to the bolt 10 and to secure the bolt 10 to the clip plate 20 at the same time as the preferred embodiment of the device disposes the bolt shank 14 in a square aperture in the clip 20; the bolt is disposed in the plate and the wire spring arm is disposed in a bolt receiving slot and the assembly placed in the press and the bolt head peaned down and riveted over the spring arm at the same time that the bolt shank 14 is peaned or riveted relative to the plate body at the bolt receiving aperture and it is obvious that automatic machinery is employed to manufacture the device wherein the spring arms, bolts, and plates are automatically fed to the press for rapid assembly manufacture.

FIG. 9 shows a clip plate 23 having a bolt and spring arm annexed thereto wherein the spring arm 25 is adapted to press on the inside face of the molding to hold the edges of the plate into firm contact with the molding flanges.

FIG. 10 shows a clip having an upwardly bent spring arm from the plate 26 and it is to be noted that the end 28 is made in a form of a sharp point for biting in to the material of the molding in conjunction with the spring action of the arm to fixedly locate the clip relative to the molding.

FIG. 11 shows a clip plate 29 equipped with a spring 30 adapted to press against the molding face with the spring arm having a reverse curve therein for contacting a molding face with torsional spring pressure.

In use of the various clips, the clip plate 20 and 20-A contact the edges 40 and 41 of the molding and lie between the flanges 42 and 43 and the face 44 of the molding with the spring arm 15 being sprung to the condition seen in FIG. 7 to rotate the clip plate 20 and 20-A into contact and it is obvious that the type of clip can be inserted at any longitudinal point of the molding and then secured to the body 50 such as by the nut 51 threaded on the bolt 10.

The clips seen in FIGS. 9, 10, and 11 are adapted to be slid longitudinally usually into the molding with the clip body lying between the molding flanges and face and with the spring arms 25, 27, and 30, respectively, contacting the molding face to force the clip plate into physical contact with the molding flanges and to hold the clip in proper location relative to the molding until the molding is mounted on a body 50.

Referring to the slotted plate device of FIG. 8 it is obvious that the torsional spring pressure of the arm 15 on the bolt 10 will move the bolt 10 to the upper end of the slot 21 as seen and it will be readily understood that in mounting the molding that the bolt can be moved downwardly in the slot 21 by manual pressure to facilitate locating the bolt in the bolt hole of the body while at the same time locating the molding relative to the body as desired thereby facilitating alignment between the hole position in the body and the desired location of the molding and providing for flexibility in mounting.

It is important to note that the manufacture of the spring clips is greatly facilitated by the spring arm being located in the bolt head and the bolt then being connected to the plate in that it is necessary to heat treat the bolts, plates, and springs after their manufacture to give them the necessary rigidity and it is obvious that the spring arm 15 can not be heat treated with the plate without destroying its spring qualities. It has therefore been one of the problems of the prior art as to how to annex a true spring arm with a heat treated plate when one is incompatible with the other. By annexing the spring arm to the bolt head and annexing the bolt to the plate the problem of providing a true spring arm with a heat treated plate has been completely solved by the instant invention due to the fact that the bolt head can be riveted around the spring arm to secure it and the bolt shank can be riveted or peaned around the plate aperture to secure the bolt to the plate. It is further obvious that a 360 degree adjustability or adaptability is facilitated due to the fact that the bolt head can be located in the plate at any desired angular position and that the spring arm can be located relative to the bolt head in any desired angular position.

The inventive spring clip with these features constitutes a compact, durable, and neat appearing efficient device easily manufactured and easily separately heat treatable.

Although but a few embodiments of the invention have been shown and described in detail it is obvious that many changes may be made in the size, shape, and detail, and arrangement of the various elements of the invention within the scope of the appended claims.

I claim:

1. A spring biased clip comprising a plate, a bolt connected to said plate, a head on said bolt having a radial slot, and a wire spring arm radially disposed in said head slot for biasing said bolt and biasing said plate via said bolt; said spring arm leverwise torsionally biasing said bolt and said bolt transferring said arm bias exerted thereon to said plate when said device is mounted in a molding.

2. A clip having a biasing spring arm particularly suitable for use in conjunction with moldings of the automotive type having attaching flanges, comprising a plate for engaging molding flanges to effect attachment of a molding to a member, said plate having a bolt receiving aperture; a bolt disposed in said plate aperture, means preventing relative movement between said bolt and plate, a head on said bolt having an axially opening slot in the top surface of said head, a wire spring arm disposed in said bolt head slot, and connecting means securing said spring arm to said bolt head, said spring arm torsionally biasing said bolt; said bolt transferring said spring arm torsional bias to said plate to urge said plate into engagement with the flanges of a molding.

3. A spring biased clip comprising a plate, a bolt connected to said plate, a head on said bolt having a radial slot, and a wire spring arm radially disposed in said head slot for biasing said bolt and biasing said plate via said bolt; said spring arm leverwise torsionally biasing said bolt and said bolt transferring said arm bias exerted thereon to said plate when said device is mounted in a molding; said plate having a channel and said bolt having an angular section shank slidably disposed in said plate channel; said bolt and plate being rotationally secured against relative movement by the connection between said angular section shank and said plate channel; said spring biasing said bolt toward one end of said plate channel; said bolt being slidable in said plate channel against said spring to selectively locate said bolt in any desired location along said channel to facilitate hole alignment and molding positioning.

4. A clip having a biasing spring arm particularly suitable for use in conjunction with moldings of the automotive type having attaching flanges, comprising a plate for engaging molding flanges to effect attachment of a molding to a member, said plate having a bolt receiving aperture; a bolt disposed in said plate aperture, means preventing relative movement between said bolt and plate, a head on said bolt having a slot in the top surface of said head, a wire spring arm disposed in said bolt head slot, and connecting means securing said spring arm to said bolt head; said connecting means comprising peaned over portions of said bolt head into said head slot and contacting said spring arm, said spring arm torsionally biasing said bolt; said bolt transferring said spring arm torsional bias to said plate to urge said plate into engagement with the flanges of a molding.

5. A clip having a biasing spring arm particularly suitable for use in conjunction with moldings of the automotive type having attaching flanges, comprising a plate for engaging molding flanges to effect attachment of a molding to a member, said plate having a bolt receiving aperture; a bolt disposed in said plate aperture, means preventing relative movement between said bolt and plate, a head on said bolt having a slot, a wire spring arm disposed in said bolt head slot, and connecting means securing said spring arm to said bolt head; said connecting means comprising peaned over portions of said bolt head into said head slot and contacting said spring arm; said bolt head having a cross-slot transverse to said slot; said connecting means comprising peaned over portions of said bolt head into both said slots and contacting said spring arm; said cross-slot providing additional evacuated area in said bolt head for receiving a portion of said peaned over material to facilitate tight engaging contact with said spring arm and to eliminate said slot spreading away from said spring arm when said head is peaned into contact with said spring arm.

References Cited in the file of this patent

UNITED STATES PATENTS

| | | |
|---|---|---|
| 231,588 | Kernochan | Aug. 24, 1880 |
| 2,385,565 | Cox | Sept. 25, 1945 |
| 2,531,351 | Churchill | Nov. 21, 1950 |
| 2,604,680 | Brack | July 29, 1952 |
| 2,709,286 | Bedford | May 31, 1955 |
| 2,713,186 | Borowsky | July 19, 1955 |
| 2,879,569 | Poupitch | Mar. 31, 1959 |

FOREIGN PATENTS

| | | |
|---|---|---|
| 974,654 | France | Oct. 4, 1950 |